Dec. 1, 1925.

W. E. PRESCOTT

MACHINE FOR MIXING

Filed Dec. 27, 1923

1,563,524

4 Sheets-Sheet 1

Inventor:
William Edward Prescott,
By Byrnes Townsend & Brickenstein,
Attys.

Dec. 1, 1925.

W. E. PRESCOTT 1,563,524

MACHINE FOR MIXING

Filed Dec. 27, 1923

4 Sheets-Sheet 2

Dec. 1, 1925

W. E. PRESCOTT

MACHINE FOR MIXING

Filed Dec. 27, 1923

1,563,524

4 Sheets-Sheet 3

Dec. 1, 1925.

W. E. PRESCOTT 1,563,524

MACHINE FOR MIXING

Filed Dec. 27, 1923

4 Sheets-Sheet 4

Inventor:
William Edward Prescott,
By Byrnes Townsend & Brickenstein,
Attorneys.

Patented Dec. 1, 1925.

1,563,524

UNITED STATES PATENT OFFICE.

WILLIAM EDWARD PRESCOTT, OF HARROW, ENGLAND.

MACHINE FOR MIXING.

Application filed December 27, 1923. Serial No. 683,050.

*To all whom it may concern:*

Be it known that I, WILLIAM EDWARD PRESCOTT, a subject of the King of the United Kingdom of Great Britain and Ireland, residing at "Birchington," 1 Northwick Avenue, Harrow, Middlesex, England, have invented certain new and useful Improvements in or Relating to Machines for Mixing (for which I have filed an application in Great Britain on 1st January, 1923), of which the following is a specification.

The invention relates to mixing machines of the kind comprising a mixing chamber wherein two coacting sets of mixing blades or beaters mounted on parallel axes in a horizontal plane operate in such manner that the paths of the blades of the two respective sets intersect within the chamber in a zone between said axes. The invention has in view more intensive mixing than heretofore and the provision of simple means for charging and removing the material into and from the mixing chamber.

In mixing machines of the kind referred to it has been proposed to provide a mixing chamber, having a feed opening immediately above the aforesaid zone and circumferential and end inner walls approximating to the non-intersecting paths of the blades except where the continuity of the circumferential wall is interrupted by said opening, and the invention primarily consists in providing a cover removably mounted in said opening and having lower walls of cusp-like transverse section to complete the continuity of the circumferential wall.

Moreover, according to the invention, the projection of cusp-like transverse section which was integral with the lateral walls in the aforesaid proposed mixing machines may be replaced by a discharge opening normally closed by a removable member having a correspondingly cusp-like transverse section.

In carrying out the invention the displaceable means comprise slides which are moved parallel to the axes of the blades by the means hereinafter described.

An example of a machine according to the invention is illustrated in the accompanying drawings wherein:—

Figure 1:
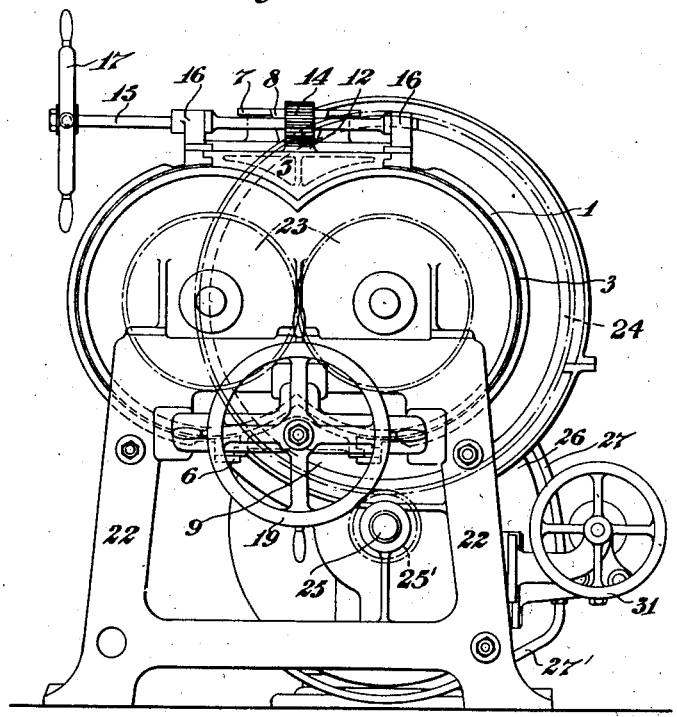
Figure 2:
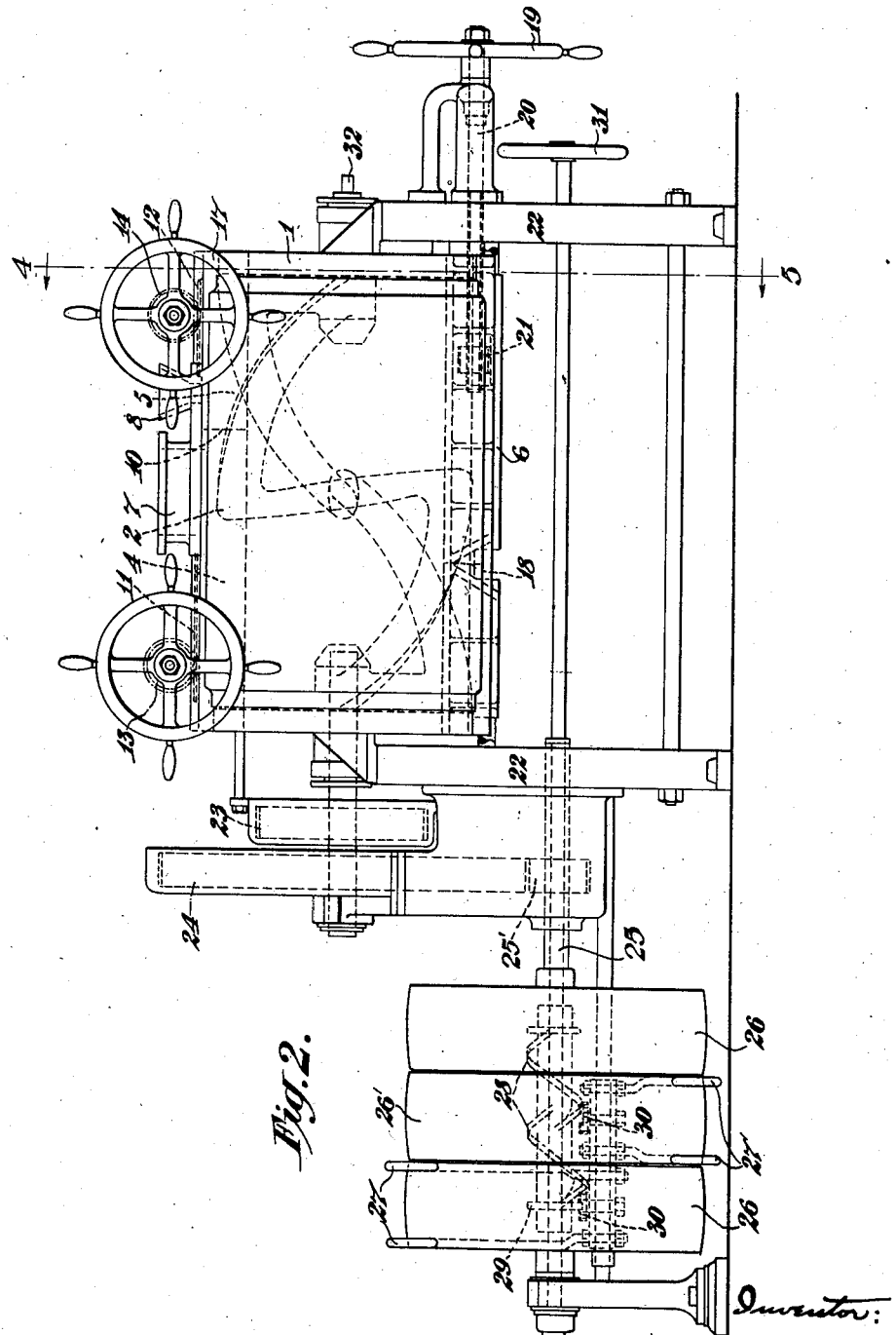
Figure 3:
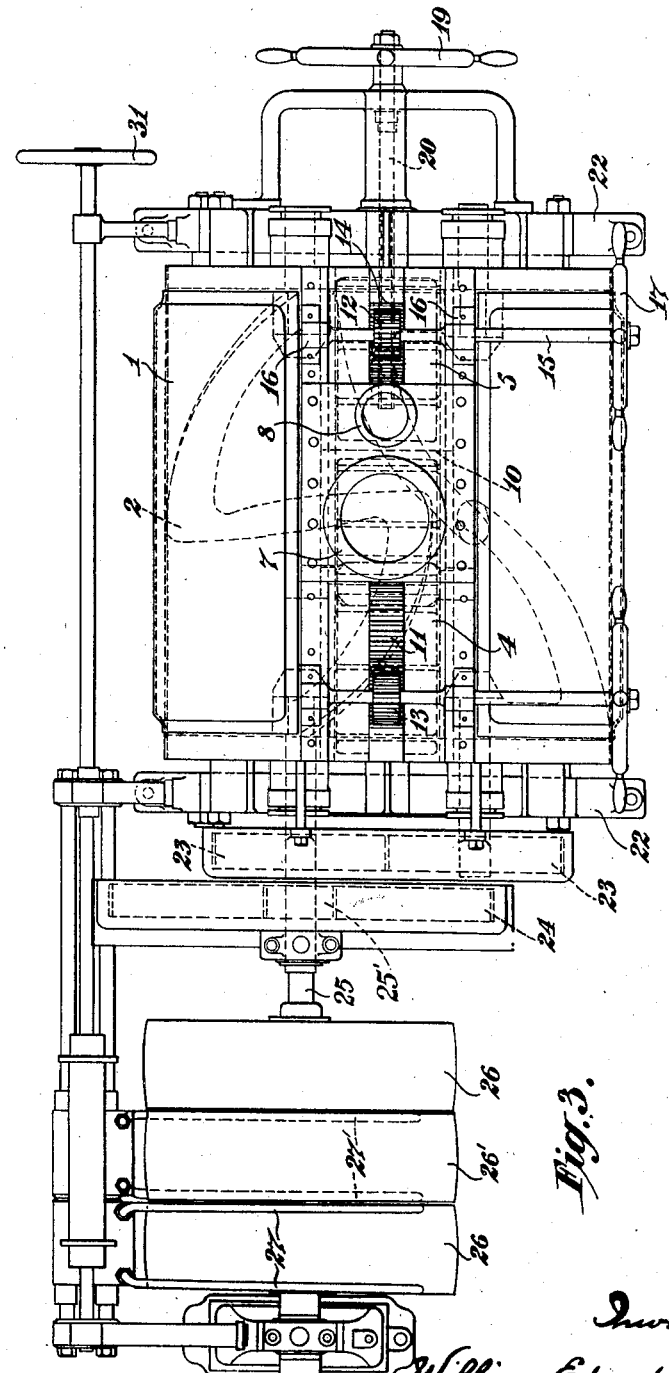
Figure 4:
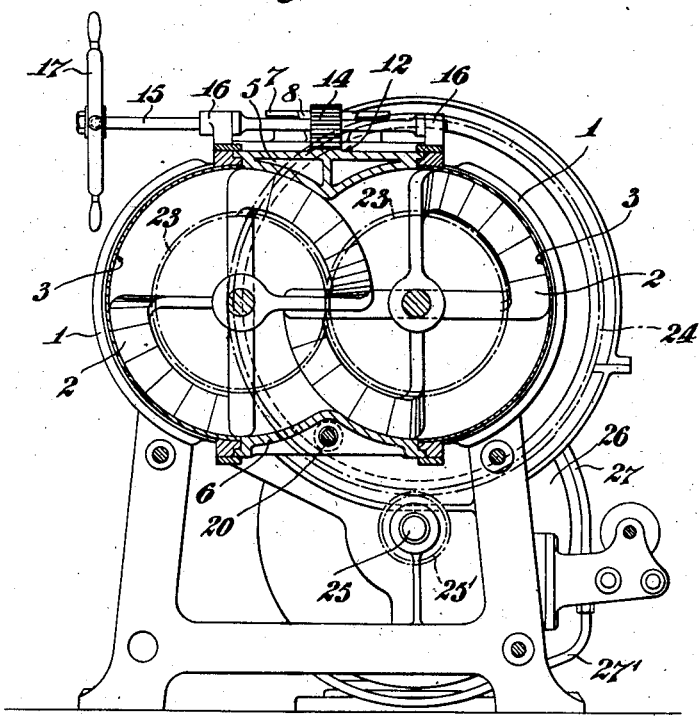

Figs. 1, 2, 3 are end elevation, side elevation and plan view respectively of a machine for intermixing ingredients, for example, sugar and cocoa liquor for chocolate manufacture, which ingredients are preferably admitted by separate inlets; Fig. 4 is a section taken on line 4—4 in Fig. 2 with the right-hand end cover of the mixing chamber removed.

In these drawings, 1 is the casing of the mixing chamber which is provided with beaters 2. The mixing chamber is formed so that its inner walls 3 approximate throughout to the non-intersecting portions of the paths of the beaters 2 during the normal operation of the machine. The top and bottom of the chamber are provided with slides 4, 5, 6 which are normally closed but may be withdrawn respectively to admit one ingredient at inlet 7, to admit a second ingredient at inlet 8, and to discharge the mixed ingredients at outlet 9. The inner faces of these slides are shown of cusp-like transverse section and constitute continuances of the curvature of the inner walls of casing 1.

The slides 4, 5 normally abut against each other at 10 and they are controlled respectively by means of racks 11, 12 driven by pinions 13, 14.

As seen from Figs. 1, 4 the pinion 14 for driving the shorter slide 5 is mounted on a spindle 15 journalled in bearings 16, 16 and provided with a hand-wheel 17. From Figs. 2, 3 it will be understood that the pinion 13 for slide 4 is similarly driven. By withdrawing slide 4 leftwardly one ingredient (e. g. sugar) may be admitted from inlet 7 and by withdrawing slide 5 rightwardly inlet 8 is opened and the second ingredient (e. g. cocoa liquor) may be admitted, said liquor conveniently entering a funnel shaped inlet as shown.

The outlet slide 6 when closed meets an abutment 18 just above discharge port 9, and may be withdrawn by means of handwheel 19 mounted on a spindle 20 having a threaded end engaging in a corresponding nut 21 let into the slide.

The casing and its accessories are mounted in a frame 22 in the manner shown. The beater shafts are coupled by intermeshing gears 23 and one of them is directly driven by the spur wheel 24 which through the intermediary of pinion 25' is driven by the main driving shaft 25 whereon two loose pulleys 26 and a fast one 26' are provided for reversing the drive by a pair of belts in known manner. The belt forks 27, 27' are shifted by means of helical threads 28 with stabilizing ends, one of which 29 is seen in engagement with the left of the two gaps 30, 30 for receiving the threads when they become operative. This helical gear is driven by a hand wheel 31 as seen clearly in Fig. 2.

The stub shaft 32 at the right of Fig. 2 serves to drive a revolution counter for use in operating the machine.

What I claim is:—

1. A mixing machine comprising a pair of mixing blades rotatable about spaced axes said blades being of such dimensions as compared to the spacing of said axes that upon rotation the paths of said blades intersect in a zone between said axes, a mixing chamber having an opening through which material may be introduced into said zone, said chamber being defined by end and circumferential walls approximating to the non-intersecting paths of said blades, except where the continuity of the wall is interrupted by said opening, and a cover removably mounted in said opening and having an inner surface completing the continuity of the chamber walls.

2. A mixing machine comprising the combination with a pair of parallel shafts having axes in a common horizontal plane and geared together for counter-directional rotation, a set of mixing blades mounted on each shaft, the two sets being so relatively dimensioned that on rotation their paths intersect in a zone between said axes, and a mixing chamber having a feed opening immediately above said zone and circumferential and end inner walls approximating to the non-intersecting paths of the blades except where the continuity of the circumferential wall is interrupted by said opening, of a cover removably mounted in said opening and having lower walls of cusp-like transverse section to complete said continuity.

3. A mixing machine comprising the combination with a pair of parallel shafts having axes in a common horizontal plane and geared together for counter-directional rotation, a set of mixing blades mounted on each shaft, the two sets being so relatively dimensioned that on rotation their paths intersect in a zone between said axes, of a mixing chamber having not only a feed opening immediately above said zone but also a discharge opening immediately below the latter and having circumferential and end inner walls approximating to the non-intersecting paths of the blades except where the continuity of the circumferential wall is interrupted by said openings, and a removable member mounted in each opening and having inner walls of cusp-like transverse section to complete said continuity.

4. A mixing machine comprising the combination with a pair of parallel shafts having axes in a common horizontal plane and geared together for counter-directional rotation, a set of mixing blades mounted on each shaft the two sets being so relatively dimensioned that on rotation their paths intersect in a zone between said axes, and a mixing chamber having a feed opening immediately above said zone and circumferential and end inner walls approximating to the non-intersecting paths of the blades except where the continuity of the circumferential wall is interrupted by said opening, of a slide movable in said opening parallel to the axes of the blades and having lower walls of cusp-like transverse section to complete said continuity.

5. A mixing machine comprising the combination with a pair of parallel shafts having axes in a common horizontal plane and geared together for counter-directional rotation, a set of mixing blades mounted on each shaft, the two sets being so relatively dimensioned that on rotation their paths intersect in a zone between said axes, of a mixing chamber having not only a feed opening immediately above said zone but also a discharge opening immediately below the latter and having circumferential and end inner walls approximating to the non-intersecting paths of the blades except where the continuity of the circumferential wall is interrupted by said openings, and a slide movable in each opening parallel to the axes of the blades and having inner walls of cusp-like transverse section to complete said continuity.

6. A mixing machine comprising the combination with a pair of parallel shafts having axes in a common horizontal plane and geared together for counter-directional rotation, a set of mixing blades mounted on each shaft, the two sets being so relatively dimensioned that on rotation their paths intersect in a zone between said axes, and a mixing chamber having a feed opening immediately above said zone and circumferential and end inner walls approximating to the non-intersecting paths of the blades except where the continuity of the circumferential wall is interrupted by said opening, of a pair of aligned slides movable in said opening parallel to the axes of the blades and having lower walls of cusp-like transverse section to complete said continuity, and means mounted above said slides and having a pair of inlets respectively above the latter for supplying different ingredients to the mixing chamber when the slides are withdrawn.

7. A mixing machine comprising the combination with a pair of parallel shafts having axes in a common horizontal plane and geared together for counter-directional rotation, a set of mixing blades mounted on each shaft, the two sets being so relatively dimensioned that on rotation their paths intersect in a zone between said axes of a mixing chamber having not only a feed opening immediately above said zone but also a discharge opening immediately below the latter and having circumferential and end inner walls approximating to the non-intersecting paths of the blades except where the continuity of the circumferential wall is interrupted by said openings, and a pair of aligned slides in said feed opening and a slide mounted in said discharge opening, all the slides being movable parallel to the axes of the blades and having inner walls of cusp-like transverse section to complete said continuity, and means mounted above said aligned slides and having a pair of inlets respectively above the latter for supplying different ingredients to the mixing chamber when these slides are withdrawn.

WILLIAM EDWARD PRESCOTT.